(12) United States Patent
Cheong et al.

(10) Patent No.: US 8,407,461 B2
(45) Date of Patent: Mar. 26, 2013

(54) PLUG-IN SYSTEM FOR SOFTWARE APPLICATIONS

(75) Inventors: Weng Cheong, San Francisco, CA (US); Eswar Vandanapu, Fremont, CA (US); Sreedhar Katti, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 12/971,382

(22) Filed: Dec. 17, 2010

(65) Prior Publication Data

US 2012/0159145 A1    Jun. 21, 2012

(51) Int. Cl.
G06F 9/06 (2006.01)
(52) U.S. Cl. ........................................................ 713/100
(58) Field of Classification Search .................... 713/100
See application file for complete search history.

(56) References Cited

U.S. PATENT DOCUMENTS

| | | | |
|---|---|---|---|
| 7,254,814 B1 * | 8/2007 | Cormier et al. | 718/106 |
| 7,296,235 B2 | 11/2007 | Bhat et al. | |
| 7,650,397 B2 | 1/2010 | Price et al. | |
| 7,653,637 B2 | 1/2010 | Thanu et al. | |
| 7,752,637 B2 | 7/2010 | Gunduc et al. | |
| 7,765,523 B2 | 7/2010 | Kooy | |
| 8,276,167 B2 * | 9/2012 | Challenger et al. | 719/331 |
| 2004/0070604 A1 | 4/2004 | Bhat et al. | |
| 2006/0085446 A1 | 4/2006 | Thanu et al. | |
| 2008/0184135 A1 | 7/2008 | Washburn et al. | |
| 2009/0006610 A1 | 1/2009 | Venable | |
| 2009/0240886 A1 | 9/2009 | Sayfan et al. | |
| 2009/0287772 A1 | 11/2009 | Stone et al. | |
| 2010/0190553 A1 | 7/2010 | Buchholz et al. | |
| 2010/0223632 A1 | 9/2010 | Regnier | |
| 2010/0251034 A1 | 9/2010 | Zhang et al. | |

OTHER PUBLICATIONS

Oracle Corporation, Oracle Identity Manager Architecture, An Oracle White Paper, Jul. 1010, http://www.oracle.com/technetwork/middleware/id-mgmt/overview/identity-manager-wp-11gr1-156947.pdf?ssSourceSiteId=ocomen.
OSGi Service Platform Core Specification, The OSGi Alliance, Release 4, Version 4.2, Jun. 2009, Section 1. Introduction, http://www.osgi.org/download/r4v41/r4.core.pdf.

* cited by examiner

*Primary Examiner* — Don Wong
*Assistant Examiner* — Deric Ortiz
(74) *Attorney, Agent, or Firm* — Squire Sanders (US) LLP

(57) ABSTRACT

A plug-in framework is invoked within a plug-in, where the plug-in framework includes a software library configured to define, register, and configure plug-ins, where the plug-in includes a software module that extends or customizes functionality of a software application that is external to the plug-in, and where the plug-in includes a mapping name. A plug-in instance declaration is searched, by the plug-in framework, for a mapping that includes the mapping name, where the plug-in instance declaration is located within a plug-in file, and where the plug-in declaration comprises one or more mappings. When a mapping of the mapping name to the value is found, the value is returned, by the plug-in framework, to the plug-in based on the mapping. The plug-in framework also allows a plug-in provider to associate a plug-in with metadata.

19 Claims, 9 Drawing Sheets

PLUG-IN SYSTEM FOR SOFTWARE APPLICATIONS

FIELD

One embodiment is directed to a computer system, and more particularly, to a computer system implementing plug-ins.

BACKGROUND

In computing, a "plug-in" is a software module that extends or customizes functionality of a software application that is external to the plug-in. A plug-in can thus, be used to satisfy the requirements of a specific deployment. A plug-in framework, such as an Open Service Gateway initiative ("OSGi") framework, allows the software application to define plug-in points that are specific points in the software application where extensibility can be provided. An interface definition accompanies the plug-in point, and is generally identified as a "plug-in interface." Users of the software application can extend the plug-in interface based on business requirements, and register the extensions of the plug-in interface with the plug-in framework as plug-ins.

In general, plug-in frameworks provide the ability to load plug-ins from various sources such as a file system or a database. Furthermore, certain plug-in frameworks also provide a way to register multiple versions of a plug-in, and set one of the versions as the version to be loaded. Thus, customers of the plug-in framework create multiple individualized plug-ins specific to one or more business requirements. This can result in a proliferation of plug-ins and an increased maintenance overhead.

SUMMARY

One embodiment is directed to a computer-readable medium having instructions stored thereon that, when executed by a processor, cause the processor to implement a plug-in system. The instructions include invoking a plug-in framework within a plug-in, where the plug-in framework includes a software library configured to define, register, and configure plug-ins, where the plug-in includes a software module that extends or customizes functionality of a software application that is external to the plug-in, and where the plug-in includes a mapping name. The instructions further include searching a plug-in instance declaration, by the plug-in framework, for a mapping that includes the mapping name, where the plug-in instance declaration is located within a plug-in file, and where the plug-in declaration comprises one or more mappings. The instructions further includes, when a mapping of the mapping name to the value is found, returning the value, by the plug-in framework, to the plug-in based on the mapping.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is directed to a plug-in system. The plug-in system allows a plug-in provider to associate a plug-in with metadata (also identified as "plug-in metadata"). The metadata associated with the plug-in can include information used to determine whether the plug-in is the correct plug-in to implement for a specific business scenario. The plug-in system also allows a plug-in to utilize mapped values. A mapped value is a value that is determined based on a mapping. Thus, a plug-in that utilizes different values based on a business scenario, and thus, is reusable across multiple business scenarios, can be created. The mapped values utilized by the plug-in can also be managed through a user interface.

Certain terms commonly utilized in the art of computer systems, and specifically, in the art of computer programming, will now be described, in order to initially introduce important terms that are more fully described and explained below. As appreciated by one of ordinary skill in the art, a class is a construct that is used as a template to create objects, or instances, of that class, where the template describes the state and behavior of the objects, or instances, that share the class. A class generally encapsulates a state through data placeholders called attributes, or variables, and encapsulates a behavior through reusable modules called methods. As also appreciated by one of ordinary skill in the art, an object, or instance, is an occurrence of a class, where a compilation of attributes or variables, and a compilation of methods encapsulate an entity represented by the object, or instance.

Furthermore, an interface is a set of methods and attributes that defines functionality for an object. As appreciated by one of ordinary skill in the art, an interface generally does not restrict how the defined functionality is implemented, and instead leaves the implementation details to a class that implements the interface. An implementation is a set of methods and attributes that implement the defined functionality of an interface.

In addition, a software library is a collection of program modules, or classes, used to develop software applications, as appreciated by one of ordinary skill in the art. An application programming interface ("API") is an interface implemented by a software application that enables the software application to communicate with another software application.

Figure 1:
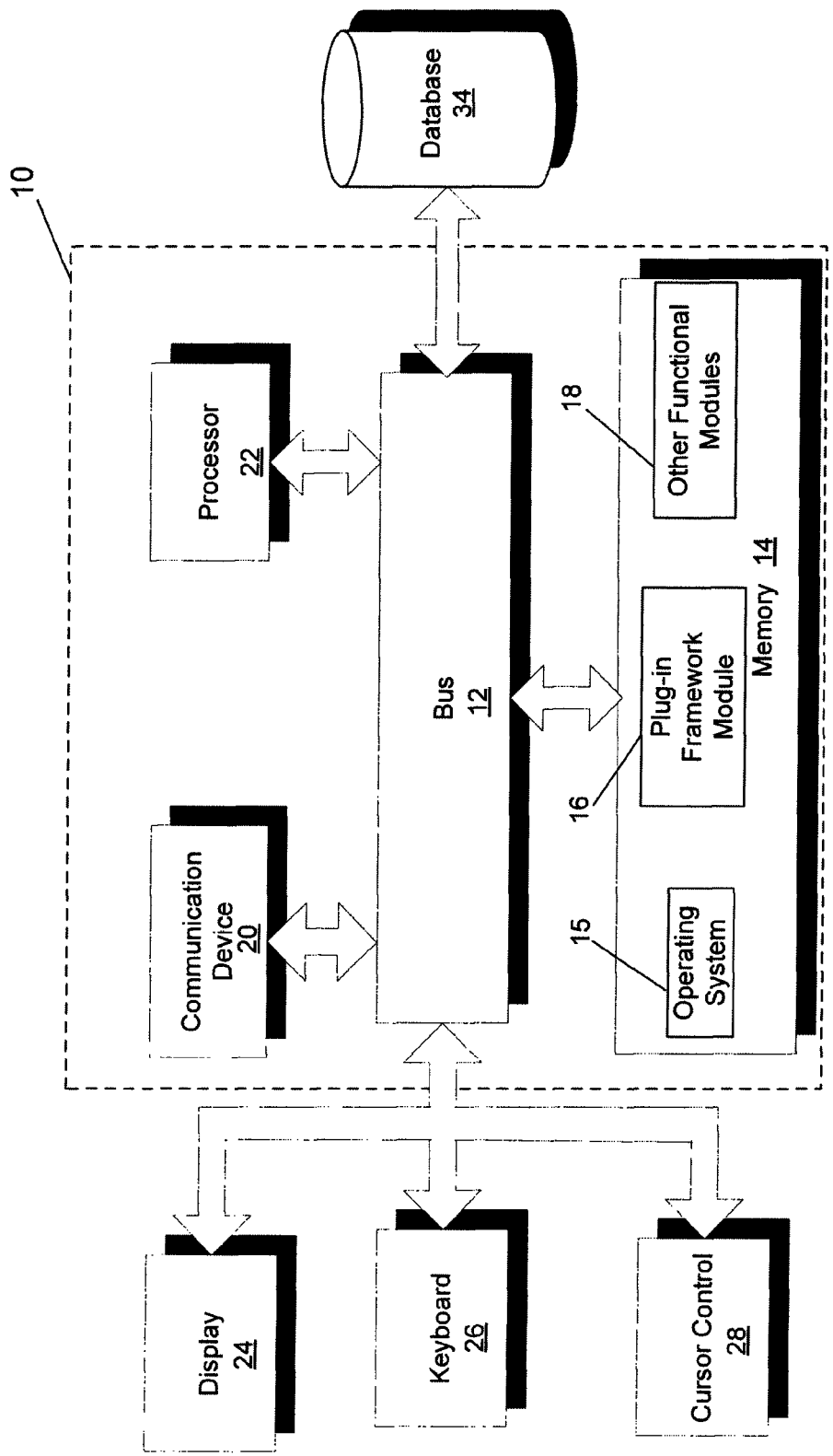
FIG. 1 illustrates a block diagram of a plug-in system that may implement an embodiment of the present invention.

FIG. 1 illustrates a block diagram of a plug-in system 10 that may implement one embodiment of the invention. Plug-in system 10 includes a bus 12 or other communications mechanism for communicating information between components of plug-in system 10. Plug-in system 10 also includes a processor 22, operatively coupled to bus 12, for processing information and executing instructions or operations. Processor 22 may be any type of general or specific purpose processor. Plug-in system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Plug-in system 10 further includes a communication device 20, such as a network interface card or other communications interface, to provide access to a network. As a result, a user may interface with plug-in system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with plug-in system 10.

According to one embodiment, memory 14 can store software modules that may provide functionality when executed by processor 22. The modules can include an operating system 15, plug-in framework module 16, as well as other functional modules 18. Operating system 15 can provide an operating system functionality for plug-in system 10. Plug-in framework module 16 can provide functionality for associating a plug-in with metadata, and for mapping values within a plug-in, as will be described in more detail below. Plug-in system 10 can also be part of a larger system. Thus, plug-in system 10 can include one or more additional functional modules 18 to include the additional functionality. For example, functional modules 18 may include modules that are part of the "Oracle Identity Manager" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
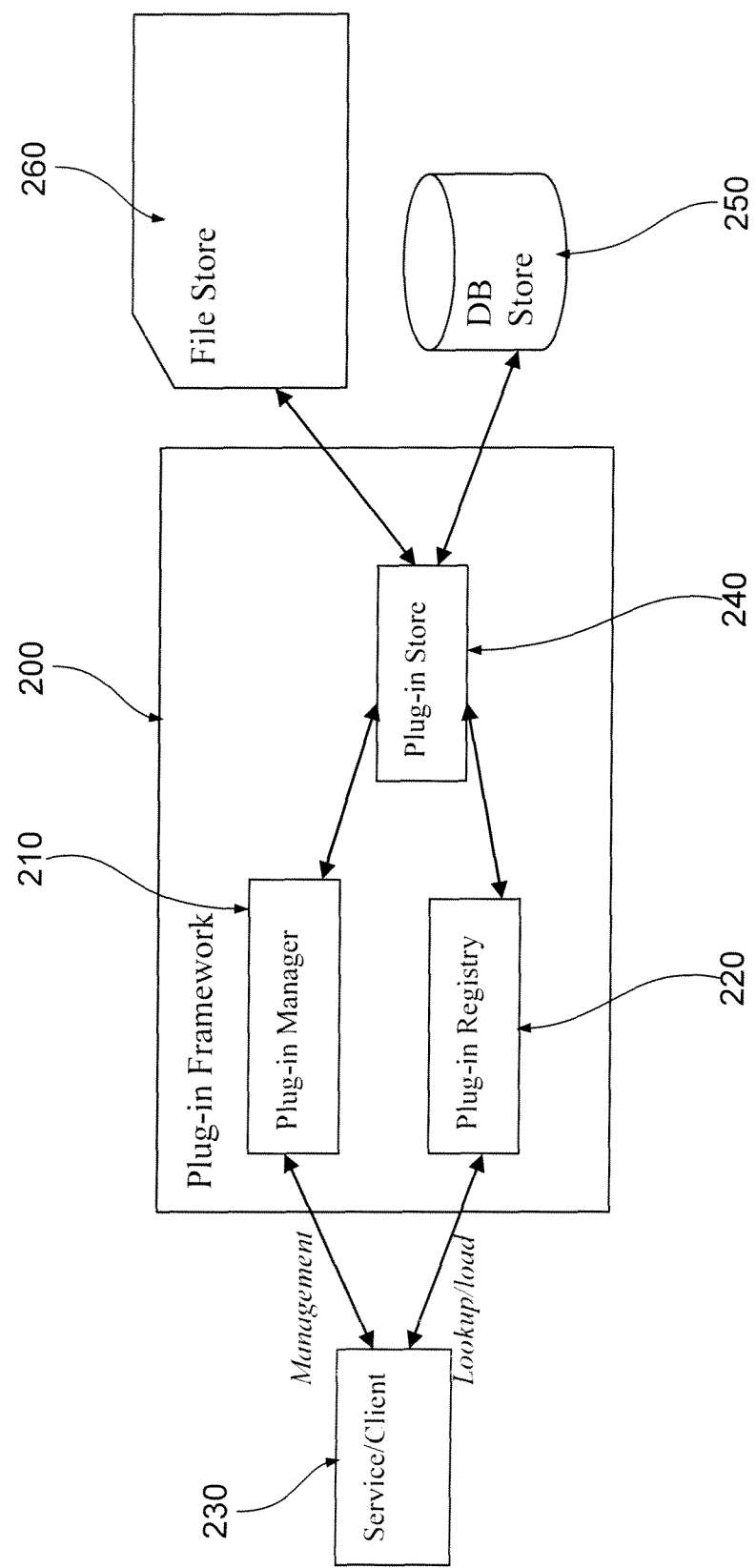
FIG. 2 illustrates a block diagram of a plug-in framework created by a plug-in system according to an embodiment of the invention.

FIG. 2 illustrates a block diagram of a plug-in framework 200 created by a plug-in system according to an embodiment of the invention. In one embodiment, plug-in framework 200, and the corresponding components of plug-in framework 200 (i.e., plug-in manager 210, plug-in registry 220, and plug-in store 240), are created by plug-in framework module 16 of plug-in system 10 illustrated in FIG. 1.

According to the embodiment, plug-in framework 200 is a software library configured to define, register, and configure plug-ins. As previously defined, a plug-in is a software module that extends or customizes functionality of a software application that is external to the plug-in.

According to one embodiment, a plug-in includes a plug-in implementation. A plug-in implementation is one or more program modules, or classes, that provide the functionality of the plug-in and implements a plug-in interface. A plug-in interface is an interface definition of one or more plug-ins that can extend an external software application, and is located in a plug-in point. A plug-in point is a specific point in an software application external to plug-in framework 200, where extensibility, or customization, of the software application can be provided by one or more plug-ins. A plug-in implementation can be instantiated by one or more plug-in instances. A plug-in instance is an instance of a plug-in implementation. A plug-in instance can include metadata associated with the plug-in and mapped values. Metadata is described in more detail below in relation to FIGS. 5 and 6. Mapped values are described in more detail below in relation to FIGS. 7, 8, and 9.

According to one embodiment, plug-in framework 200 is a software library written using the Java® programming language. According to this embodiment, a plug-in interface and plug-in implementation are an interface and implementation, respectively, written using the Java® programming language, where the interface and implementation each include one or more Java® classes. Furthermore, according to this embodiment, a plug-in instance is an instance of the plug-in implementation that includes one or more Java® objects.

According to an embodiment of the invention, a plug-in can be distributed as an archive file, also identified as a plug-in file, where the plug-in file includes a plug-in implementation. An example of a plug-in file is a Java® archive ("JAR") file. As one of ordinary skill in the art would readily appreciate, a JAR file is a file that aggregates one or more files, and is generally used to distribute Java® applications or libraries in the form of classes. As one of ordinary skill in the art would also appreciate, another example of a plug-in file is a zip file, which is another type of archive file that aggregates one or more files. According to the embodiment, a plug-in file can include a directory structure, where the directory structure includes one or more files. The directory structure, including the one or more files, is contained within the plug-in file. Furthermore, the plug-in file can be expanded, where the directory structure, including the one or more files, can be removed from the plug-in file and stored in a physical location, independent of the plug-in file.

In accordance with an embodiment, the directory structure of the plug-in file can include an extensible markup language ("XML") file. An example of an XML file is plugin.xml. The XML file can contain metadata associated with the plug-in. Metadata is described in more detail below in relation to FIGS. 5 and 6. The XML file also includes a name of a plug-in point that the plug-in extends, a name of a class implementing the plug-in, a name of the plug-in, and a version number of the plug-in. The directory structure further includes archive files containing one or more classes implementing the plug-in, including any dependent library archive files, and also includes one or more resources files used by the plug-in.

According to the embodiment, a location where a plug-in file is stored is identified as a plug-in storage. Furthermore, a package containing one or more plug-ins is called a plug-in package, or a plug-in ZIP file. A plug-in package may include support libraries used by the plug-in.

According to an embodiment, a plug-in is implemented as a Java® class. A plug-in file can contain other classes as well, but the class implementing the plug-in may be the only class that is exposed to a software application external to plug-in framework 200. The class, or classes, can be specified in the XML file of the plug-in file, in accordance with the embodiment. A Java® class that implements a plug-in is also identified as a "plug-in class." The plug-in class can also access the resources included in the plug-in file. As an example, the plug-in class can access the resources by invoking the following method:

this.getClass( ).getClassLoader( ).getResourceAtStream (<resource_name>)

According to an embodiment, a plug-in can be stored as a part of plug-in framework 200, or can be stored as part of a software application external to plug-in framework 200. In the scenario where the plug-in is stored as part of the software application, the plug-in is considered to be part of plug-in framework 200, even though the plug-in is stored in a location external to plug-in framework 200. According to the embodiment, a plug-in that is part of the software application can be packaged in a JAR file, or zip file, of the software application external to plug-in framework 200.

Plug-in framework 200 includes plug-in manager 210. Plug-in manager 210 is an API configured to allow a software application to register and de-register plug-ins of plug-in framework 200. In FIG. 2, the term "management" refers to the registration and de-registration operations. According to an embodiment, plug-in manager 200 validates input data transmitted by a software application, and interacts with plug-in store 240 (described below in greater detail) in order to register or de-register a plug-in of plug-in framework 200. In one embodiment, plug-in manager 210 includes a plug-in manager interface, and corresponding plug-in manager implementation. According to the embodiment, plug-in manager 210 interacts with plug-in framework 200 in order to acquire an instance of plug-in store 240. The operations performed by plug-in manager 210 are described below in greater detail in relation to FIG. 3.

term "lookup/load" refers to the query and instantiation operations. According to an embodiment of the invention, plug-in registry 220 implements a custom class loader to load a selected plug-in. According to the embodiment, separate instances of this custom class loader can be created, one per plug-in file. These instances of the custom class loader can be cached in plug-in registry 220 so that the custom class loader does not need to be initialized every time the plug-in needs to be loaded. The operations performed by plug-in registry 210 are described below in greater detail in relation to FIG. 4.

FIG. 2 also illustrates service/client 230, which is an example of an software application that is external to plug-in framework 200. In an embodiment, service/client 230 includes one or more program modules that provide functionality, where the functionality can be enhanced, or customized, by one or more plug-ins of plug-in framework 200. According to the embodiment, service/client 230 interacts with plug-in framework 200 using plug-in manager 210 and plug-in registry 220. More specifically, service/client 230 registers and de-registers a plug-in through interacting with plug-in manager 210. The interaction between service/client 230 and plug-in manager 210 is described below in greater detail in relation to FIG. 3. Furthermore, service/client 230 queries for and instantiates a plug-in through interacting with plug-in registry 220. The interaction between service/client 230 and plug-in registry 220 is described below in greater detail in relation to FIG. 4.

According to an embodiment, service/client 230 can declare one or more plug-in points, where each plug-in point corresponds to an area of service/client 230 that can be extended, or customized. A plug-in point that is declared is identified as a plug-in point declaration. A plug-in point for service/client 230 can either be declared explicitly or implicitly, in accordance with the embodiment. To declare a plug-in point explicitly, a plug-in point is explicitly declared in a file of a package that contains service/client 230. In one embodiment, a plug-in point is explicitly declared in an XML file, such as pluginpoint.xml. An example of an XML file that explicitly declares a plug-in point is provided below:

```
<?xml version="1.0" encoding="UTF-8"?>
<oimpluginpoints>
    ....
    <pluginpoints>
        <pluginpoint
        pluginpoint="oracle.iam.sample.passwdmgmt.service.PasswordElement"
        resolver="oracle.iam.sample.passwdmgmt.service.PasswordElement.Runt
        imeValueResolver" description="Plug-in point for password element" />
    </pluginpoints>
    ....
</oimpluginpoints>
```

Plug-in framework also includes plug-in registry 220. Plug-in registry 220 is an API configured to perform query and instantiation operations. More specifically, plug-in registry 220 is configured to interact with plug-in store 240 through querying plug-in store 240 for available plug-ins. Plug-in registry 220 is also configured to load a selected plug-in, and instantiate the selected plug-in. In FIG. 2, the To declare a plug-in point implicitly, a plug-in is declared, where the plug-in references a plug-in point, in a file of a plug-in file. A plug-in that is declared is identified as a plug-in declaration. In one embodiment, a plug-in point is implicitly declared in an XML file of a plug-in file, such as plugin.xml. An example of an XML file that implicitly declares a plug-in point is provided below:

```
<?xml version="1.0" encoding="UTF-8"?>
<oimplugins>
    ....
```

```
<plugins
pluginpoint="oracle.iam.sample.passwdmgmt.service.PasswordElement">
    <plugin pluginclass=
    "oracle.iam.sample.passwdmgmt.custom.NumCustomPasswordElement"
        version="1.0.1" name="num pwd element"/>
    <plugin pluginclass=
    "oracle.iam.sample.passwdmgmt.custom.DictionaryPasswordElement"
        version="1.0.1" name="Dictionary password element" />
</plugins>
....
</oimplugins>
```

According to an embodiment, a plug-in or a plug-in point (or both) can be declared in a library that is external to both plug-in framework 200 and service/client 230. In an embodiment, where plug-in framework 200 is part of larger system, such as the "Oracle Identity Manager" product from Oracle Corporation, a plug-in or a plug-in point (or both) can be declared using an external XML file, located within the larger system.

According to an embodiment, when service/client 230 declares a plug-in point, service/client 230 can also provide runtime value mapping for a plug-in. In order for plug-in framework 200 to resolve runtime mapped values of a plug-in, service/client 230 can provide a runtime value resolver for resolving the values at runtime. The responsibility of a runtime value resolver, according to the embodiment, is to return a mapped value based on a mapping name. According to an embodiment, a runtime value resolver is a Java® class that implements a runtime value resolver interface, and implements the following method:

value resolver, and runtime value mapping, are both described in more detail below in relation to FIGS. 7, 8, and 9.

According to an embodiment, a plug-in instance can be declared. This is identified as a plug-in instance declaration. As previously described, a plug-in instance is an instance of a plug-in, and can include static mapping (identified in this specification as "simple value mapping") and/or dynamic mapping (identified as "runtime value mapping"). In an embodiment, where the plug-in instance includes runtime value mapping, service/client 230 also declares a plug-in point that includes a runtime value resolver. Simple value mapping and runtime value mapping are each described in more detail below in relation to FIGS. 7, 8, and 9.

According to an embodiment, a plug-in instance can be declared in an XML file of a plug-in file, such as plugin.xml. An example of such a plug-in instance declaration is as follows:

```
<?xml version="1.0" encoding="UTF-8"?>
<oimplugininstances>
    <plugininstances name="CustomPasswordElementInstance" plugin="num pwd element"
            pluginpoint="
oracle.iam.sample.passwdmgmt.service.PasswordElement"
            version="1.0.1">
        <metadata name="meta1">
            <value>1</value>
        </metadata>
        <mapping method="evaluate">
            <simple-mapping name="attr1" entity-type="User" value="smvalue1" />
            <runtime-mapping name="phone" entity-type="User" attribute="phonenumber"
                    value="N/A" />
        </mapping>
        <mapping>
            <simple-mapping name="attr1" entity-type="User" value="value1" />
            <simple-mapping name="attr2" entity-type="User" attribute="smattr2" />
            <runtime-mapping name="fname" entity-type="User" attribute="firstname" />
            <runtime-mapping name="lname" entity-type="User" attribute="lastname" />
        </mapping>
        <description>Test class for plugin mapped value</description>
    </plugininstances>
</oimplugininstances>
``` public Object resolve (String entityType, String methodName, Object[ ] args)

The entityType parameter refers to an entity type that the plug-in is attempting to resolve. The method name parameter is the name of the method in the plug-in attempting to resolve the values. The args parameter is the arguments of the method in the plug-in attempting to resolve the values. The resolve method returns a mapping to one or more values. A runtime The above plug-in instance declaration declares a plug-in instance with both simple value mapping and runtime value mapping. According to the embodiment, both simple value mapping and runtime value mapping can be declared for a specific method or all methods in the plug-in instance. Simple value mapping and runtime value mapping are described below in greater detail in relation to FIGS. 7, 8, and 9.

According to an embodiment, service/client 230 can use plug-in registry 220 to discover plug-ins. An example of source code within service/client 230 that uses plug-in registry 220 to discover plug-ins is as follows:

```
List<Plugin> plugins =
PluginRegistry.getPlugins("oracle.iam.service.passwordmgmt.domain.Password
Element");
```

Another example of source code within service/client 230 that uses plug-in registry 220 to discover plug-ins is as follows:

```
    List<Plugin> plugins =
    PluginRegistry.getPlugins(PasswordElement.class.getName( ));
```

According to an embodiment, plug-in framework 200 provides an plug-in API that encapsulates the details of the plug-in. Furthermore, plug-in framework provides a method to get an instance of the plug-in, as shown below in the following example:

```
    public List<PasswordElement> getCustomPasswordElements( ){
    List<PasswordElement> customPwdElems = new
ArrayList<PasswordElement>( );
    List<Plugin> plugins = PluginRegistry.getPlugins
(PasswordElement.class.getName( ));
        for (Plugin plugin : plugins) {
    customPwdElems.add((PasswordElement) plugin.getInstance( ))
        }
        return customPwdElems;
    }
```

Furthermore, according to the embodiment, service/client 230 can get an instance of a plug-in using a plug-in point name and a plug-in class name, as shown in the following example:

```
PasswordElement pwdElement =
PluginRegistry.getPluginInstance("oracle.iam.service.passwordmgmt.domain.Pa
sswordElement", "com.acme.iam.plugin.CustomPasswordElement");
```

In addition, according to the embodiment, service/client 230 can get an instance of a plug-in using a plug-in point name and a plug-in point identity rather than the plug-in class name, as shown in the following example:

```
PasswordElement pwdElement =
PluginRegistry.getPluginInstanceByName("oracle.iam.service.passwordmgmt.do
main.PasswordElement", "CustomPasswordElement");
```

The operation of accessing a plug-in at runtime is described below in greater detail in relation to FIG. 4.

According to an embodiment, metadata can be associated with each plug-in that is defined in an XML file of a plug-in file. Metadata is described in more detail below in relation to FIGS. 5 and 6.

Plug-in framework also includes plug-in store 240. Plug-in store 240 is an API configured to interact with a data storage where one or more plug-ins are stored. According to the embodiment, plug-in store 240 is used internally within plug-in framework 200 by plug-in manager 210 and plug-in registry 220. Plug-in store 240 is further configured to load a plug-in and return the plug-in to plug-in registry 220, which in turn is configured to return the plug-in to service/client 230. According to an embodiment, plug-in store 240 includes a common store class that is associated with three internal components of the data storage, where the three internal components are described below in greater detail. The common store class is configured to interact with all three internal components, and is further configured to retrieve one or more plug-ins from all three internal components, and load the one or more plug-ins.

FIG. 2 also illustrates DB store 250 and file store 260. According to an embodiment of the invention, a data storage, where one or more plug-ins are stored, can include three internal components. The first internal component of a data storage is service/client 230 (and is identified as an "internal storage"). As previously described, a plug-in can be stored as part of service/client 230. According to an embodiment of an invention, service/client 230 can specify one or more plug-in points, and can specify one or more plug-ins for each plug-in point, with annotations. Plug-in framework 200 can then use the annotations to create an XML file that includes all the plug-in points and corresponding plug-in implementations. An example of an XML file is plugins.xml. According to the embodiment, plug-in framework 200 can then access the plug-in information from the XML file. In this embodiment, service/client 230 is not required to register its one or more plug-ins with plug-in framework 200.

The second internal component of a data storage is DB store 250. DB store 250 is configured to interact with a database to store and retrieve one or more plug-ins to and from the database. The database can be an operational database, an analytical database, a data warehouse, a distributed database, an end-user database, an external database, a navigational database, an in-memory database, a document-oriented database, a real-time database, a relational database, an object-oriented database, or any other database known in the art. According to an embodiment, DB store 250 can interface with the database using an API, such as Java Database Connectivity ("JDBC"). According to an embodiment, plug-ins that are stored in the database can also be registered by plug-in registry 220.

The third internal component of a data storage is file store 260. File store 260 is configured to interact with a file system that includes a directory structure, where the directory structure includes one or more computer files. File store 260 is further configured to store and retrieve one or more plug-ins to and from the file system. As previously discussed, a plug-in can be distributed as a plug-in file. As also previously discussed, a plug-in file can include a directory structure, where the directory structure includes one or more files. According to an embodiment, file store 260 can store a plug-in to a directory of the file system either as a plug-in file or as a directory structure. Plug-in framework 200 looks for a plug-in under the directory of the file system using file store 260. Furthermore, according to an embodiment, additional plug-in directories can also be registered. In this embodiment, these additional plug-in directories can be specified in a file that is stored in the file system. In one embodiment, this file is an XML file, such as xlconfig.xml.

According to the embodiment, file store 260 is configured to load one or more plug-ins from the file system. Upon a request by service/client 230, file store 260 can select a plug-in from the file system and load the plug-in. If a plug-in is in a plug-in file format, a first class can be used to load the plug-in. In an embodiment, the first class is a plug-in class loader. However, if a plug-in is in a plug-in directory structure format, a second class can be used to load the plug-in. In an embodiment, the second class is java.net.URLClassLoader.

According to an embodiment, a thread can be initiated that monitors the file system. As one of ordinary skill in the art would readily appreciate, a thread is a subset of a process, where a process is an instance of a program module being executed. The thread is configured to monitor the one or more registered files where plug-ins are stored, and determine if one or more plug-ins are modified. According to an embodiment, the thread can be configured to check for any modifications at a specified interval. A user can configure the specified interval with which the thread checks for any modifications. A user can also configure whether the thread is initiated. In an embodiment of the invention, the configuration can be done in an XML file, such as oim-config.xml. An example of an XML file, is as follows:

```
<pluginConfig storeType="common">
    <storeConfig reloadingEnabled="true" reloadingInterval="60">
        <!--
            Plugins present in the OIM_HOME/plugins directory
            are added by default.
                For adding more plugins, specify the plugin directory
                as below:
                    <registeredDirs>/scratch/oimplugins</registeredDirs>
                    <registeredDirs>/scratch/custom</registeredDirs>
        -->
    </storeConfig>
</pluginConfig>
```

According to an embodiment, a plug-in file can include an XML file that includes metadata associated with the plug-in. The metadata can be loaded from the XML file of the plug-in file and maintained in memory. In accordance with an embodiment, file store 260, upon registration, can look for one or more registered directories and load the metadata associated with the one or more plug-ins stored in the one or more registered directories, and maintain the metadata in memory. Metadata is described in more detail below in relation to FIGS. 5 and 6.

According to the embodiment, where plug-in framework 200 is a software library written using the Java® programming language, plug-in framework 200 includes one or more Java® classes used by a software application external to plug-in framework 200 to acquire instances of plug-in manager 210 and plug-in registry 220. According to the embodiment, plug-in framework 200 is also used by plug-in manager 210 and plug-in registry 220 internally to acquire an instance of plug-in store 240. The one or more Java® classes include all the objects of plug-in manager 210, plug-in registry 220, and plug-in store 240 as static variables, and includes static methods for accessing them.

Figure 3:
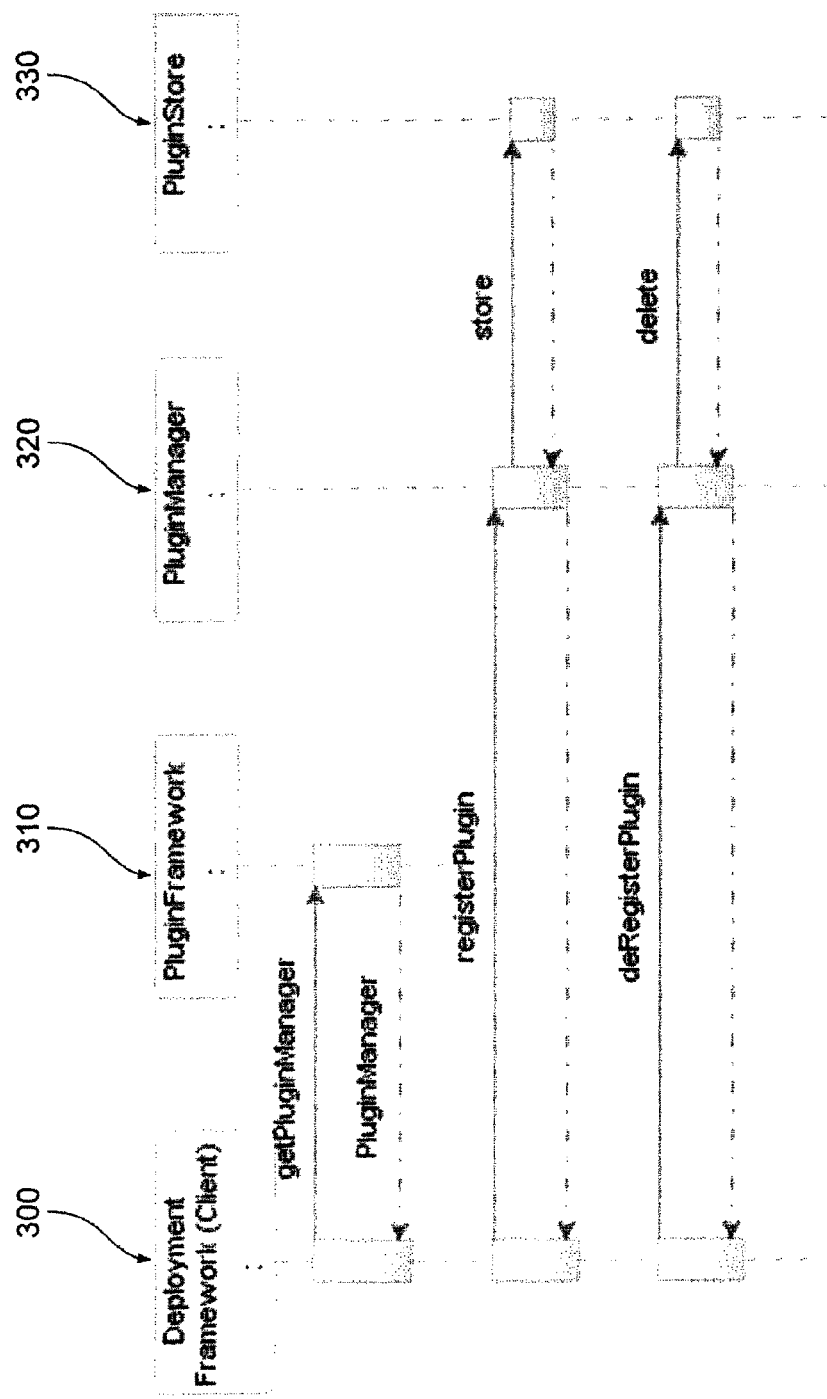
FIG. 3 illustrates a sequence diagram of registering and de-registering a plug-in according to an embodiment of the invention.

FIG. 3 illustrates a sequence diagram of registering and de-registering a plug-in according to an embodiment of the invention. The sequence diagram includes Deployment Framework (Client) 300. Deployment Framework (Client) 300 is either a software application that is external to a plug-in framework, or a deployment framework that the software application is a component of. The sequence diagram further includes PluginFramework 310. PluginFramework 310 is an instance of a plug-in framework. The sequence diagram further includes PluginManager 320. PluginManager 320 is an instance of a plug-in manager. The sequence diagram further includes PluginStore 330. PluginStore 330 is an instance of a plug-in store.

According to an embodiment of the invention, Deployment Framework (Client) 300 registers a plug-in by first invoking a method, getPluginManager, of PluginFramework 310. Once the getPluginManager method is invoked, PluginFramework 310 returns an instance of a plug-in manager (i.e., PluginManager 320) to Deployment Framework (Client) 300.

After Deployment Framework (Client) 300 receives the instance of the plug-in manager (i.e., PluginManager 320), Deployment Framework (Client) 300 registers the plug-in by invoking a method, registerPlugin, of PluginManager 320. Once the registerPlugin method is invoked, PluginManager 320 invokes a method, store, of PluginStore 330. Once the store method is invoked, PluginStore 330 stores the plug-in in a storage and returns execution control to PluginManager 320. Once the plug-in is stored, and execution control is returned to PluginManager 320, PluginManager 320 returns execution control to Deployment Framework (Client) 300.

In accordance with an embodiment, Deployment Framework (Client) 300 deregisters a plug-in by invoking a method, deRegisterPlugin, of PluginManager 320. Once the deRegisterPlugin method is invoked, PluginManager 320 invokes a method, delete, of PluginStore 330. Once the delete method is invoked, PluginStore 330 deletes the plug-in from the storage and returns execution control to PluginManager 320. Once the plug-in is deleted, and execution control is returned to PluginManager 320, PluginManager 320 returns execution control to Deployment Framework (Client) 300.

Figure 4:
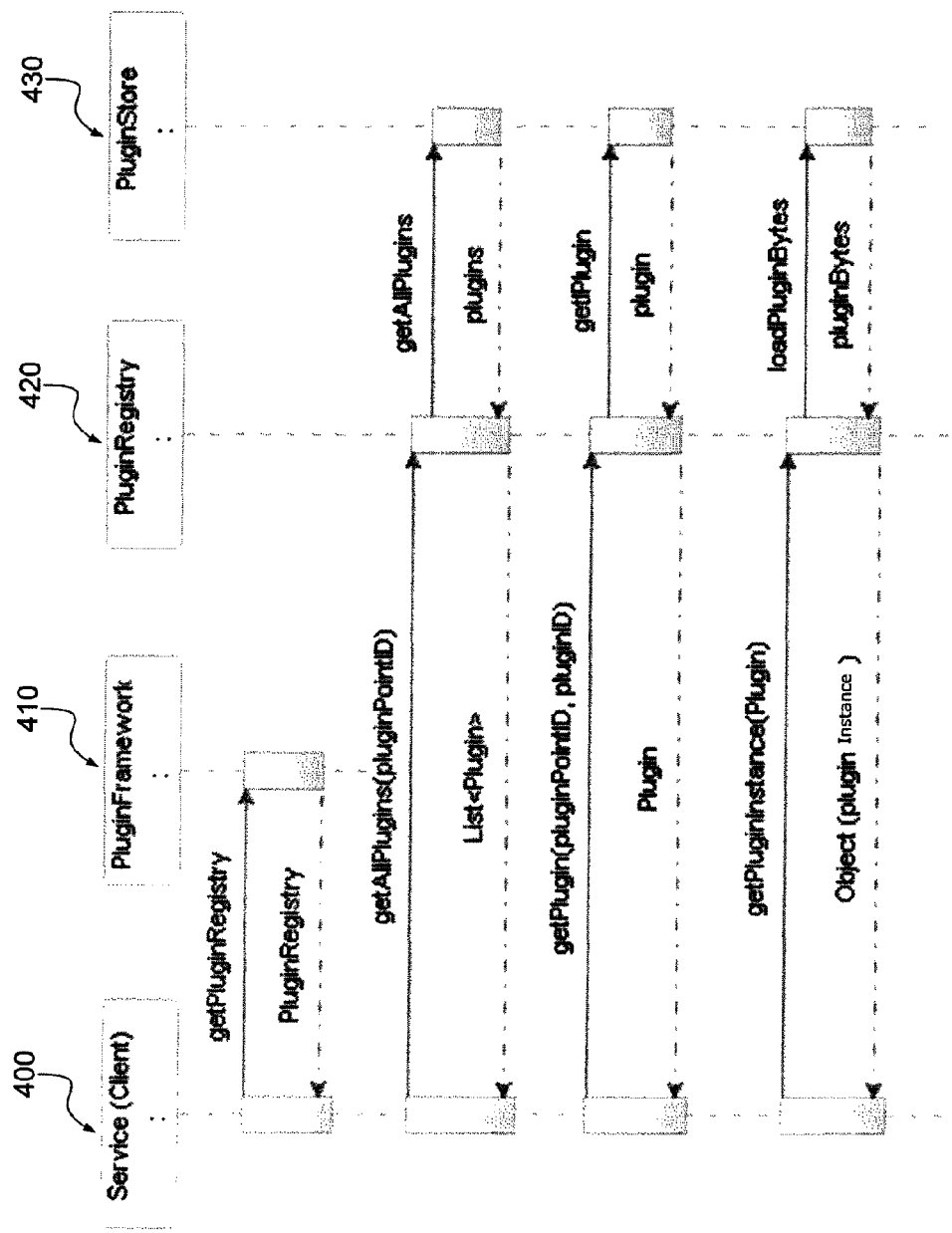
FIG. 4 illustrates a sequence diagram of querying for and instantiating a plug-in according to an embodiment of the invention.

FIG. 4 illustrates a sequence diagram of querying for and instantiating a plug-in according to an embodiment of the invention. The sequence diagram includes Service (Client) 400. Service (Client) 400 is a software application that is external to a plug-in framework. The sequence diagram further includes PluginFramework 410. PluginFramework 410 is an instance of a plug-in framework. The sequence diagram further includes PluginRegistry 420. PluginRegistry 420 is an instance of a plug-in registry. The sequence diagram further includes PluginStore 430. PluginStore 430 is an instance of a plug-in store.

According to an embodiment of the invention, Service (Client) 400 queries for, and instantiates, a plug-in by first invoking a method, getPluginRegistry, of PluginFramework 410. Once the getPluginRegistry method is invoked, PluginFramework 410 returns an instance of a plug-in registry (i.e., PluginRegistry 420) to Service (Client) 400.

After Service (Client) 400 receives the instance of the plug-in registry (i.e., PluginRegistry 420), Service (Client) 400 invokes a method, getAllPlugins, of PluginRegistry 420.

In invoking the getAllPlugins method, Service (Client) 400 passes an argument, pluginPointID, to PluginRegistry 420 that includes an identity of a plug-in point. PluginRegistry 420 uses the argument, pluginPointID, to invoke a method, getAllPlugins, of PluginStore 430. PluginStore 430 retrieves one or more plug-ins and returns the one or more plug-ins to PluginRegistry 420. Once PluginRegistry 420 receives the one or more plug-ins, PluginRegistry 420 returns a list of one or more plug-ins to Service (Client) 400, where the list includes a plug-in identity of each plug-in returned by PluginStore 430.

After Service (Client) 400 receives the list of one or more plug-ins, Service (Client) 400 invokes a method, getPlugin, of PluginRegistry 420. In invoking the getPlugin method, Service (Client) 400 passes two arguments, pluginPointID and pluginID, to PluginRegistry 420. As previously described, the pluginPointID argument includes an identity of a plug-in point. Furthermore, the pluginID argument includes an identity of a plug-in that Service (Client) 400 wishes to instantiate. PluginRegistry 420 uses the two arguments, pluginPointID and pluginID, to invoke a method, getPlugin, of PluginStore 430. PluginStore 430 retrieves a plug-in and returns the plug-in to PluginRegistry 420. Once PluginRegistry 420 receives the plug-in, PluginRegistry 420 returns the plug-in to Service (Client) 400.

After Service (Client) 400 receives the plug-in, Service (Client) 400 invokes a method, getPluginInstance, of PluginRegistry 420. In invoking the getPluginInstance method, Service (Client) 400 passes in an argument, Plugin, that includes the plug-in received from PluginRegistry 420. PluginRegistry 420 uses the Plugin argument to invoke a method, loadPluginBytes of PluginStore 430. PluginStore 430 instantiates an instance of the plug-in and returns the instance of the plug-in to PluginRegistry 420. Once PluginRegistry 420 plug-in, including any dependent library archive files, and resource 520 includes one or more resources files used by the plug-in.

According to the embodiment, XML file 530 includes information regarding a plug-in. For example, XML file 530 includes a name of a plug-in point that the plug-in extends, a name of a class implementing the plug-in, a name of the plug-in, and a version number of the plug-in. In accordance with the embodiment, XML file 530 also includes metadata 535. Metadata 535 is metadata that is associated with the plug-in. In accordance with an embodiment, metadata 535 includes one or more properties. As an example, a property can comprise a name-value pair. The one or more properties can be viewed by a plug-in framework, and the plug-in framework can use the one or more properties to determine if a plug-in is applicable for a specific business scenario. As an example, a first plug-in that is applicable for generating a password comprising numbers can be associated with metadata comprising a property known as PasswordElementNum, with a value of 1. As an additional example, a second plug-in that is applicable for generating a password comprising letters can be associated with metadata comprising a property known as PasswordElementNum, but with a value of 2. Thus, according to the embodiment, a plug-in framework can view the metadata associated with each plug-in and determine that the first plug-in is applicable for a business scenario requiring a password comprising numbers, and that the second plug-in is applicable for a business scenario requiring a password comprising letters. Therefore, the plug-in framework can load and instantiate the plug-in that is applicable for the business scenario.

An example of plug-in metadata, stored in an XML file, is as follows:

```
<oimplugins>
    ....
    <plugins
pluginpoint="oracle.iam.sample.passwdmgmt.service.PasswordElement">
        <plugin pluginclass=
"oracle.iam.sample.passwdmgmt.custom.NumCustomPasswordElement"
            version="1.0.1" name="num pwd element">
            <metadata name="PasswordElementNum"><value>1</value></metadata>
        </plugin>
        <plugin pluginclass=
"oracle.iam.sample.passwdmgmt.custom.DictionaryPasswordElement"
            version="1.0.1" name="Dictionary password element" >
            <metadata name="PasswordElementNum"><value>2"</value></metadata>
        </plugin>
    </plugins>
    ....
</oimplugins>
``` receives the instance of the plug-in, PluginRegistry 420 returns the instance of the plug-in to Service (Client) 400.

Plug-in metadata will now be described in greater detail in relation to FIGS. 5 and 6. As previously described, metadata associated with a plug-in can include information used to determine whether the plug-in is the correct plug-in to implement. As also previously described, metadata can be associated with a plug-in that is defined in an XML file of a plug-in file.

Figure 5:
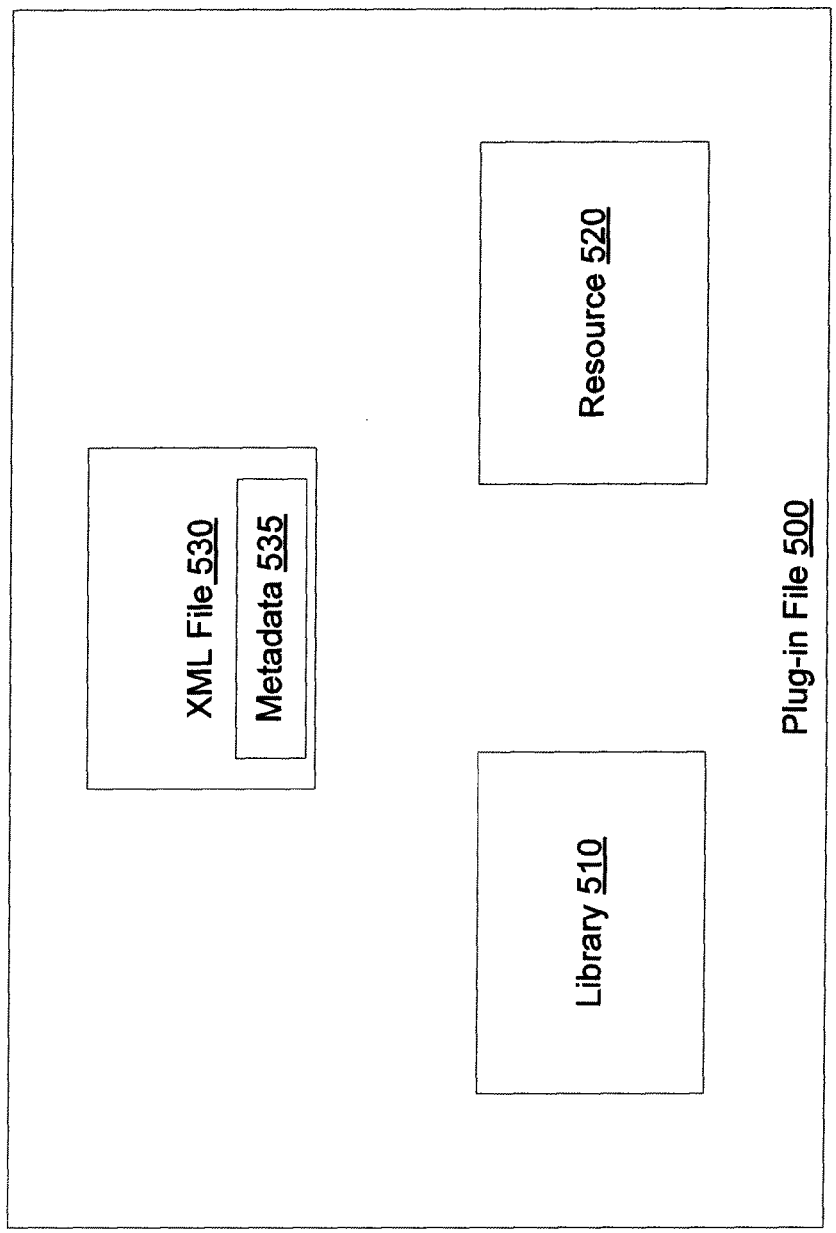
FIG. 5 illustrates metadata associated with a plug-in according to an embodiment of the invention.

FIG. 5 illustrates metadata associated with a plug-in according to an embodiment of the invention. FIG. 5 illustrates plug-in file 500. In the illustrated embodiment, plug-in file 500 includes library 510, resource 520, and XML file 530. In accordance with the embodiment, library 510 includes archive files containing one or more classes implementing the In the above example, the property "PasswordElementNum" associated with the value of 1, is an example of plug-in metadata. In addition, the property "Password ElementNum" associated with the value of 2, is another example of plug-in metadata.

Figure 6:
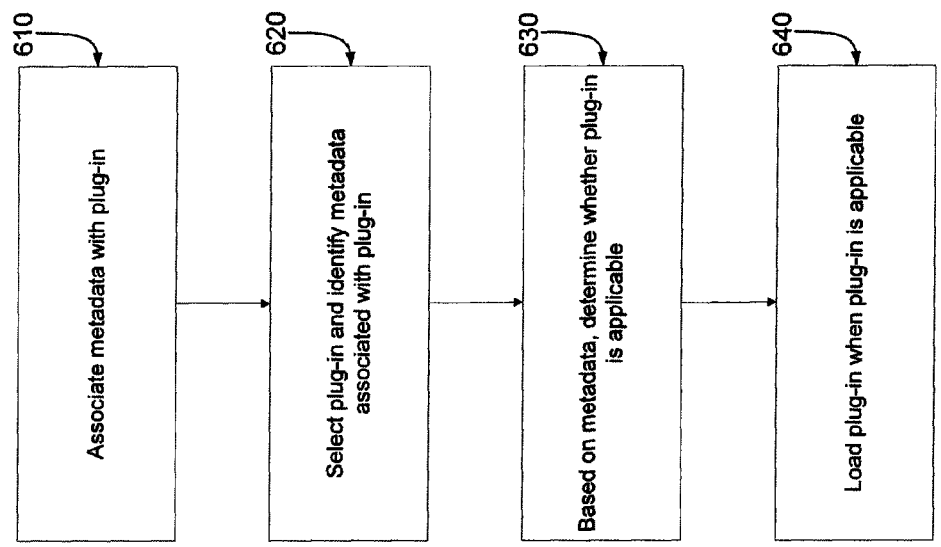
FIG. 6 illustrates a flow diagram of the functionality of a plug-in framework module that associates metadata with a plug-in according to an embodiment of the invention.

FIG. 6 illustrates a flow diagram of the functionality of a plug-in framework module that associates metadata with a plug-in according to an embodiment of the invention. In one embodiment, the functionality of the flow diagram of FIG. 6, and the functionality of the flow diagram of FIG. 9, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 610, metadata is associated with a plug-in. According to an embodiment, metadata includes one or more properties, where each property includes a name-value pair. According to an embodiment, associating the metadata with the plug-in includes storing the metadata in an XML file of a plug-in file. The metadata can be associated with the plug-in by a plug-in framework according to an embodiment.

At 620, a plug-in is selected, and the metadata associated with the plug-in is identified. According to an embodiment, an external software application can request one or more plug-ins from a plug-in framework, and the plug-in framework can select a plug-in from a plug-in storage and identify the metadata associated with the plug-in.

At 630, it is determined whether the plug-in is applicable based on the metadata associated with the plug-in. According to an embodiment, the metadata associated with the plug-in can include information regarding the plug-in that indicates whether the plug-in is applicable. According to the embodiment, a plug-in is "applicable" if the plug-in is the correct plug-in to implement in a specific business scenario based on the functionality of the plug-in. In accordance with an embodiment, the metadata associated with the plug-in includes one or more properties, where each property includes a name-value pair. The value of the name-value pair can provide information regarding the functionality of the plug-in, and the value of the name-value pair can be evaluated to determine whether the plug-in is applicable. In an embodiment, a plug-in framework determines whether the plug-in is applicable based on the metadata associated with the plug-in.

At 640, the plug-in is loaded when the plug-in is applicable based on the metadata associated with the plug-in. According to the embodiment, when the plug-in framework determines that the plug-in is applicable based on the metadata associated with the plug-in, the plug-in framework loads and instantiates the plug-in. The details regarding loading and instantiating the plug-in are previously described in relation to FIG. 4.

Mapped values will now be described in greater detail in relation to FIGS. 7, 8, and 9. As previously described, a plug-in provides functionality that extends or customizes functionality of a software application that is external to the plug-in. In order to provide functionality, a plug-in utilizes one or more values. According to an embodiment of the invention, a plug-in can invoke a plug-in framework in order to determine one or more values based on a mapping. These values are identified as "mapped values." In accordance with an embodiment of the invention, rather than including one or more values that are assigned during development of the plug-in, the plug-in includes one or more values that can be determined by the plug-in framework based on a mapping. In an embodiment of the invention, the mapping is provided by the plug-in, and the mapping is identified as "simple value mapping." This mapping is static, as the mapping of one or more values is the same no matter which plug-in point the plug-in is extending or customizing. In an alternate embodiment, the mapping is provided by a plug-in point, utilizing a runtime value resolver, and the mapping is identified as "runtime value mapping." This allows the mapping to be dynamic, as the mapping of one or more values in the plug-in can be determined at runtime, depending on which plug-in point the plug-in is extending or customizing.

According to an embodiment of the invention, a plug-in can define its simple value mapping and/or runtime value mapping in an XML file of a plug-in file, such as plugin.xml. In accordance with the embodiment, the mappings are declared in a plug-in instance declaration. As previously described, a plug-in instance can also be declared in an XML file of a plug-in file, such as plugin.xml. An example of such a plug-in instance declaration (that has been previously described) is shown below, where simple value mappings and runtime value mappings of the plug-in declaration have been bolded:

```
<?xml version="1.0" encoding="UTF-8"?>
<oimplugininstances>
    <plugininstances name="CustomPasswordElementInstance" plugin="num pwd element"
        pluginpoint="
oracle.iam.sample.passwdmgmt.service.PasswordElement"
        version="1.0.1">
        <metadata name="meta1">
            <value>1</value>
        </metadata>
        <mapping method="evaluate">
            <simple-mapping name="attr1" entity-type="User" value="smvalue1" />
            <runtime-mapping name="phone" entity-type="User" attribute="phonenumber"
                value="N/A" />
        </mapping>
        <mapping>
            <simple-mapping name="attr1" entity-type="User" value="value1" />
            <simple-mapping name="attr2" entity-type="User" attribute="smattr2" />
            <runtime-mapping name="fname" entity-type="User" attribute="firstname" />
            <runtime-mapping name="lname" entity-type="User" attribute="lastname" />
        </mapping>
        <description>Test class for plugin mapped value</description>
    </plugininstances>
</oimplugininstances>
```

The above plug-instance declaration declares a plug-in point with both simple value mapping and runtime value mapping. According to an embodiment, simple value mapping and runtime value mapping can be declared for a specific method of the plug-in or all methods of the plug-in. In the above example, a simple value mapping, "attr1," and a runtime value mapping, "phone," are both defined for an evaluate method of the plug-in. Furthermore, two simple value mappings, "attr1," and "attr2," and two runtime value mappings, "fname," and "lname," are defined for all methods of the plug-in.

According to an embodiment, a simple value mapping can map a mapping name to either a value or an attribute. If the simple value mapping maps a mapping name to a value, this means that, wherever the mapping name is utilized in the plug-in, a plug-in framework can replace the mapping name with the mapped value. If the simple value mapping maps a mapping name to an attribute, this means that, wherever the mapping name is utilized in the plug-in, a plug-in framework can use the attribute to determine a mapped value, and can replace the mapping name with the mapped value. In accordance with an alternate embodiment, a runtime value mapping can map a mapping name to an attribute. Similar to a simple value mapping, when a runtime value mapping maps a mapping name to an attribute, this means that, wherever the mapping name is utilized in the plug-in, a plug-in framework can use the attribute to determine a mapped value, and can replace the mapping name with the mapped value. According to an embodiment, in the case of either a simple value mapping or a runtime value mapping, the mapping name that is utilized in the plug-in, and the mapped value that replaces the mapping name, can be collectively identified as a mapped value.

In the case of a simple value mapping, if the simple value mapping maps a mapping name to an attribute, then the plug-in framework uses the attribute as a key to look up a value in a hash map that is provided by the plug-in. Furthermore, according to the embodiment, the mapping name and the mapped value are identified as a "simple mapped value." In the case of a runtime value mapping, if the runtime value mapping maps a mapping name to an attribute, then the plug-in framework uses the attribute as a key to look up a value in a hash map that is provided by a runtime value resolver in a plug-in point. Furthermore, according to the embodiment, the mapping name and the mapped value are identified as a "runtime mapped value."

As previously described, a runtime value resolver, according to an embodiment, returns a mapping of values based on provided parameters. According to an embodiment, a runtime value resolver is a Java® class that implements a runtime value resolver interface, and implements the following method:

public Object resolve (String entityType, String methodName, Object[ ] args)

As also previously described, the entityType parameters refers to an entity type that the plug-in is attempting to resolve. The method name parameter is the name of the method in the plug-in attempting to resolve the values. The args parameter is the arguments of the method in the plug-in attempting to resolve the values. The resolve method implements a hash table that is used to provide mapped values to a plug-in framework. When runtime value mapping maps a mapping name to an attribute, the plug-in framework uses the attribute as a key to look up a value in the hash map of the runtime value resolver.

Figure 7:
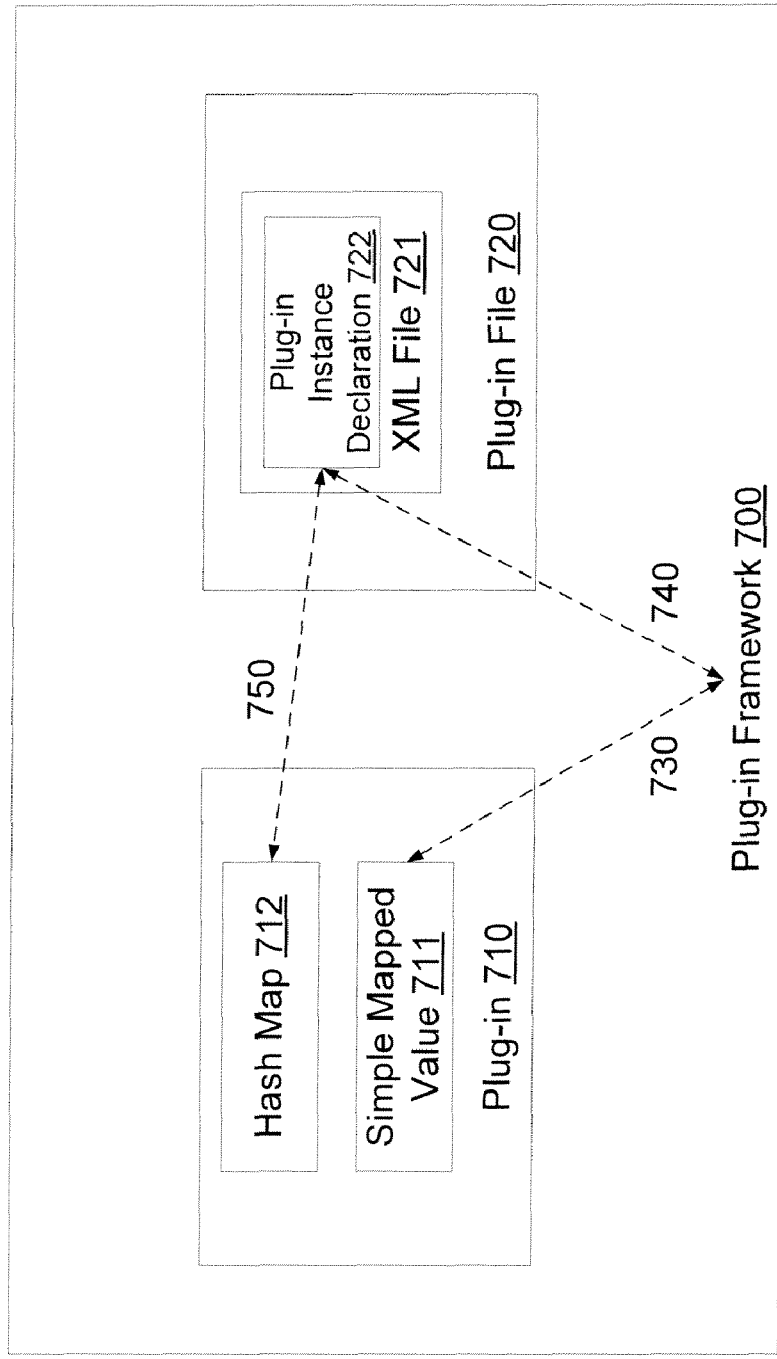
FIG. 7 illustrates a plug-in that utilizes a simple mapped value according to an embodiment of the invention.

FIG. 7 illustrates a plug-in that includes a simple mapped value according to an embodiment of the invention. Specifically, according to the embodiment, FIG. 7 illustrates a plug-in framework 700. Plug-in framework 700 includes a plug-in 710, and plug-in 710 includes a simple mapped value 711 and a hash map 712. As previously described, simple mapped value 711 refers to a mapping name utilized in the plug-in, and the value that the mapping name ultimately maps to.

Plug-in framework 700 also includes a plug-in file 720. Plug-in file 720 includes an XML file 721. XML file 721 includes a plug-in instance declaration 722. According to the embodiment, plug-in instance declaration 722 includes one or more simple value mappings and one or more runtime value mappings (not shown). Plug-in instance declaration 722 can include any number of simple value mappings, and any number of runtime value mappings, as shown in the previous example.

According to the embodiment, plug-in framework 700 uses the following logic to determine a value for simple mapped value 711. Plug-in framework 700 accesses a mapping name of simple mapped value 711, and a method name of plug-in 710, from plug-in 710, as illustrated by arrow 730 in FIG. 7. Plug-in framework 700 then searches the one or more simple value mappings in plug-in instance declaration 722 for the mapping name, as illustrated by arrow 740 in FIG. 7. If plug-in instance declaration 722 has a mapping specified for the method name with a mapping name that matches the mapping name of simple mapped value 711, then that mapping is used. Otherwise, if plug-in instance declaration 722 has a mapping specified for all methods with a mapping name that matches the mapping name of simple mapped value 711, that mapping is used. Otherwise, a NoSuchMappingException is thrown by plug-in framework 700. Once the mapping has been selected, plug-in framework 700 evaluates the mapping in plug-in instance declaration 722 to determine whether the mapping name is mapped to a value or an attribute. If the mapping name is mapped to a value, then the value is returned to plug-in framework 700, as illustrated by arrow 740 in FIG. 7, and the value is subsequently returned to plug-in 710, as illustrated by arrow 730 in FIG. 7. If the mapping name is mapped to an attribute, then plug-in framework 700 uses the attribute as a key to search hash map 712 of plug-in 710, as illustrated by arrow 750 in FIG. 7. When the value that corresponds to the attribute is located in hash map 712, the value is returned to plug-in framework 700, as illustrated by arrows 750 and 740 in FIG. 7, and the value is subsequently returned to plug-in 710, as illustrated by arrow 730 in FIG. 7.

According to the embodiment, the following is an example on how to access a simple mapped value in a plug-in:

```
public public boolean evaluate(String password) {
    Map<String, Object> ro = new HashMap<String, Object>( );
    ro.put("smvalue1", "value");
    ro.put("smattr2", "value2");
    // Using the mappings previously declared, attr1 would
    // have the value of "smvalue1".
    String attr1 = PluginFramework.getMappedValue(this, ro, "attr1",
      "evaluate");
    // Using the mappings previously declared, attr2 would
    // have the value of "value2"
    String attr2 = PluginFramework.getMappedValue(this, ro, "attr2",
      "evaluate");
}
```

In the above example, a hash map, "ro", is created in the plug-in. A first value, "value," is inserted into hash map "ro" with a key of "smvalue1." A second value, "value2," is also inserted into hash map "ro" with a key of "smattr2." Subsequently, according to the embodiment, a getMappedValue method of a plug-in framework is invoked in the plug-in, where the plug-in passes a mapping name, "attr1," a name of the plug-in method, "evaluate," and the hash map of the plug-in, "ro." The plug-in framework then searches the mappings of a plug-in instance declaration for the mapping name.

In the above example of a plug-in declaration, the plug-in declaration includes the following simple value mapping:

```
<mapping method="evaluate">
    <simple-mapping name="attr1" entity-type="User"
        value="smvalue1" />
```

The simple value mapping is specified for the "evaluate" method, and has a mapping name of "attr1." Because the method name of the simple value mapping matches the name of the plug-in method passed into the plug-in framework, and because the mapping name of the simple value mapping matches the mapping name passed into the plug-in framework, the simple value mapping is selected. While the above example of a plug-in declaration also includes a simple value mapping with a mapping name "attr1" that is specified for all methods, the simple value mapping that is specified for the "evaluate" method is given priority over the simple value mapping that is specified for all methods. As can be seen, the simple value mapping for "attr1" specified for the "evaluate" method maps to a value, "smvalue1." Therefore, the value "smvalue1" is returned to the plug-in, and is assigned to the string variable "attr1."

Subsequently, according to the embodiment, a getMappedValue method of a plug-in framework is invoked in the plug-in, where the plug-in passes a mapping name, "attr2," a name of the plug-in method, "evaluate," and the hash map of the plug-in, "ro." The plug-in framework then searches the mappings of a plug-in instance declaration for the mapping name. In the above example of a plug-in declaration, the plug-in declaration includes the following simple value mapping:
  <mapping>
  . . .
  <simple-mapping   name="attr2"   entity-type="User"
      attribute="smattr2"/>

While the plug-in declaration does not include a simple value mapping with a mapping name of "attr2," that is specified for the "evaluate" method, the above simple value mapping is specified for all methods, and has a mapping name of "attr2." Because the mapping name of the simple value mapping matches the mapping name passed into the plug-in framework, and because the simple value mapping is specified for all methods, the simple value mapping is selected. As can be seen, the simple value mapping for "attr2" maps to an attribute, "smattr2." Because the simple value mapping maps to an attribute, the plug-in framework searches the hash map "ro," for the attribute "smattr2." As can be seen from the example plug-in described above, the hash map include a key "smattr2" that matches the attribute "smattr2," and the key "smattr2" references a value "value2." Therefore, the value "value2" is returned to the plug-in, and is assigned to the string variable "attr2."

Figure 8:
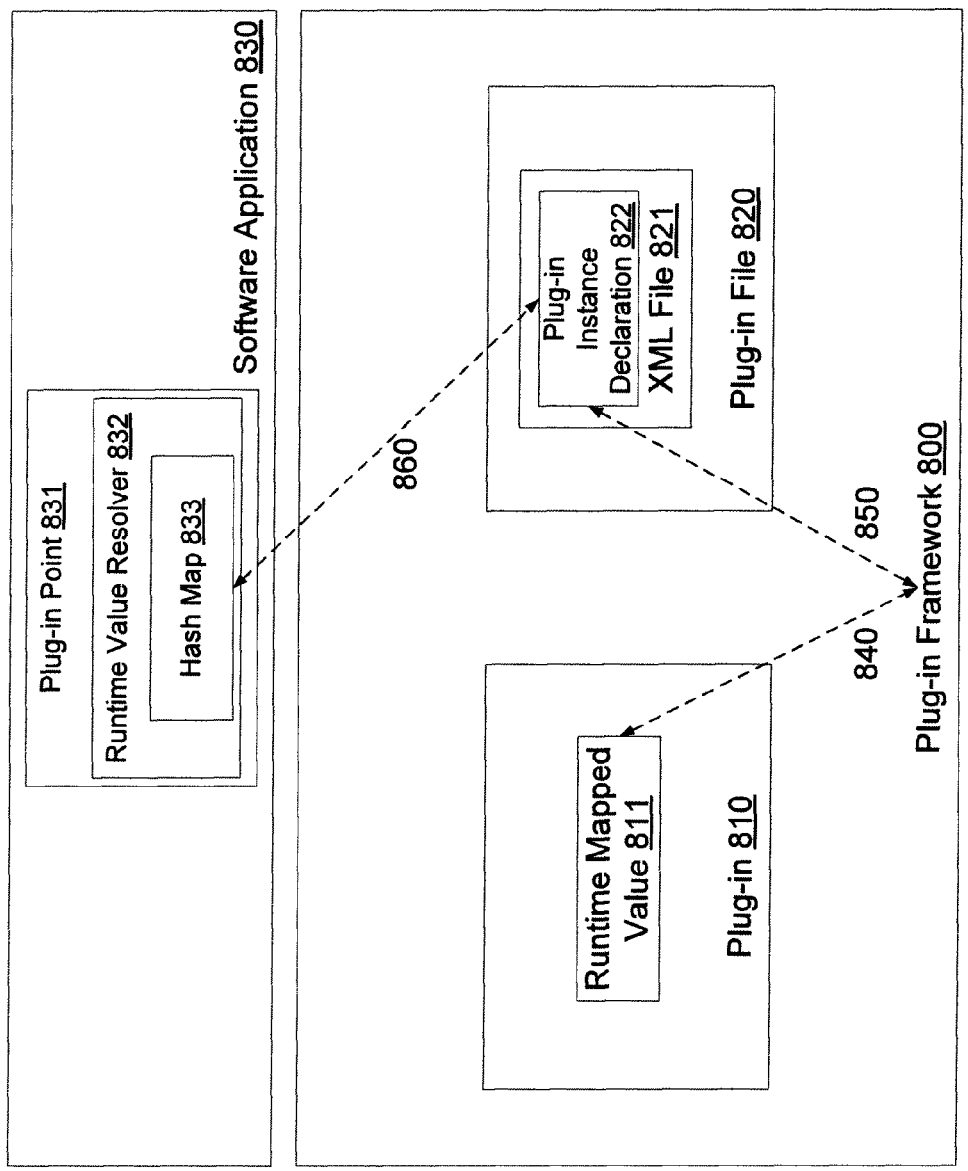
FIG. 8 illustrates a plug-in that utilizes a runtime mapped value according to an embodiment of the invention.

FIG. 8 illustrates a plug-in that includes a runtime mapped value according to an embodiment of the invention. Specifically, according to the embodiment, FIG. 8 illustrates a plug-in framework 800. Plug-in framework 800 includes a plug-in 810, and plug-in 810 includes a runtime mapped value 811. As previously described, runtime mapped value 811 refers to a mapping name utilized in the plug-in, and the value that the mapping name ultimately maps to. Plug-in framework 800 also includes a plug-in file 820. Plug-in file 820 includes an XML file 821. XML file 821 includes a plug-in instance declaration 822. According to the embodiment, plug-in instance declaration 822 includes one or more simple value mappings and one or more runtime value mappings (not shown). Plug-in instance declaration 822 can include any number of simple value mappings, and any number of runtime value mappings, as has been previously described. FIG. 8 also illustrates a software application 830 that is external to plug-in framework 800, and that provides functionality that is extended, or customized, by plug-in 810. Software application 830 includes a plug-in point 831. Plug-in point 831 includes runtime value resolver 832. Runtime value resolver 832 includes hash map 833. According to this embodiment, hash map 833 replaces hash map 712 of FIG. 7.

According to the embodiment, the logic that plug-in framework 800 uses to determine a value for runtime mapped value 811 is the same as the logic used to determine a value for a simple mapped value except that plug-in 810 does not need to provide a hash map. Instead, hash map 833 is obtained from runtime resolver 832 of plug-in point 831. More specifically, plug-in framework 800 accesses a mapping name of runtime mapped value 811, and a method name of plug-in 810, from plug-in 810, as illustrated by arrow 840 in FIG. 8. Plug-in framework 800 then searches the one or more runtime value mappings in plug-in instance declaration 822 for the mapping name, as illustrated by arrow 850 in FIG. 8. If plug-in instance declaration 822 has a mapping specified for the method name with a mapping name that matches the mapping name of runtime mapped value 811, then that mapping is used. Otherwise, if plug-in instance declaration 822 has a mapping specified for all methods with a mapping name that matches the mapping name of runtime mapped value 811, that mapping is used. Otherwise, a NoSuchMappingException is thrown by plug-in framework 800. Once the mapping has been selected, plug-in framework 800 evaluates the mapping in plug-in instance declaration 822 to determine whether the mapping name is mapped to a value or an attribute. If the mapping name is mapped to a value, then the value is returned to plug-in framework 800, as illustrated by arrow 850 in FIG. 8, and the value is subsequently returned to plug-in 810, as illustrated by arrow 840 in FIG. 8. If the mapping name is mapped to an attribute, then plug-in framework 800 uses the attribute as a key to search hash map 833 of runtime value resolver 832 of plug-in point 831, as illustrated by arrow 860 in FIG. 8. When the value that corresponds to the attribute is located in hash map 833, the value is returned to plug-in framework 800, as illustrated by arrows 860 and 850 in FIG. 8, and the value is subsequently returned to plug-in 810, as illustrated by arrow 840 in FIG. 8.

An example of a runtime value resolver is provided as follows:

```
public Object resolve(String entityType, String methodName, Object[ ]
args) {
    Map<String, Object> attrs = new HashMap<String, Object>( );
    attrs.put("firstname", "John");
    attrs.put("lastname", "Smith");
    attrs.put("email", "john.smith@company.com");
    return (attrs);
```

In the example, the runtime value resolver creates a hash map, "attrs," within an implementation of a resolve method. A first value, "John," is inserted into hash map "attrs" with a key of "firstname." A second value, "Smith," is also inserted into hash map "attrs" with a key of "lastname." A third value, "john.smith@company.com" is also inserted into hash map "attrs" with a key of "email." The hash map is then returned by the resolve method implementation of the runtime value resolver.

According to the embodiment, the following is an example on how to access a simple mapped value in a plug-in:

```
public boolean evaluate(String password) {
    // Using the mappings previously declared, attr1 would
    // have the value of "John".
    String attr1 = PluginFramework.getMappedValue(this, "fname",
"evaluate", new Object[ ]{password});
    // Using the mappings previously declared, attr2 would
    // have the value of "Smith"
    String attr2 = PluginFramework.getMappedValue(this, "lname",
"evaluate", new Object[ ]{password});
}
```

In the above example, a getMappedValue method of a plug-in framework is invoked in the plug-in, where the plug-in passes a mapping name, "fname," and a name of the plug-in method, "evaluate." The plug-in framework then searches the mappings of a plug-in instance declaration for the mapping name. In the above example of a plug-in declaration, the plug-in declaration includes the following runtime value mapping:

<mapping>

...

<runtime-mapping name="fname" entity-type="User" attribute="firstname"/>

While the plug-in declaration does not include a runtime value mapping with a mapping name of "fname," that is specified for the "evaluate" method, the above runtime value mapping is specified for all methods, and has a mapping name of "fname." Because the mapping name of the runtime value mapping matches the mapping name passed into the plug-in framework, and because the runtime value mapping is specified for all methods, the runtime value mapping is selected. As can be seen, the runtime value mapping for "fname" maps to an attribute, "firstname." Because the runtime value mapping maps to an attribute, the plug-in framework searches the hashmap "attrs" in the runtime value resolver of the plug-in point described above for the attribute "firstname." As can be seen from the example hashmap of the runtime value resolver of the plug-in point described above, the hash map include a key "firstname" that matches the attribute "firstname," and the key "firstname" references a value "John." Therefore, the value "John" is returned to the plug-in, and is assigned to the string variable "attr1."

Subsequently, according to the embodiment, a getMappedValue method of a plug-in framework is invoked in the plug-in, where the plug-in passes a mapping name, "lname," and a name of the plug-in method, "evaluate." The plug-in framework then searches the mappings of a plug-in instance declaration for the mapping name. In the above example of a plug-in declaration, the plug-in declaration includes the following runtime value mapping:

<mapping>

...

<runtime-mapping name="lname" entity-type="User" attribute="lastname"/>

While the plug-in declaration does not include a runtime value mapping with a mapping name of "lname," that is specified for the "evaluate" method, the above runtime value mapping is specified for all methods, and has a mapping name of "lname." Because the mapping name of the runtime value mapping matches the mapping name passed into the plug-in framework, and because the runtime value mapping is specified for all methods, the runtime value mapping is selected. As can be seen, the runtime value mapping for "lname" maps to an attribute, "lastname." Because the runtime value mapping maps to an attribute, the plug-in framework searches the hashmap "attrs" in the runtime value resolver of the plug-in point described above for the attribute "lastname." As can be seen from the example hashmap of the runtime value resolver of the plug-in point described above, the hash map include a key "lastname" that matches the attribute "lastname," and the key "lastname" references a value "Smith." Therefore, the value "Smith" is returned to the plug-in, and is assigned to the string variable "attr2."

Figure 9:
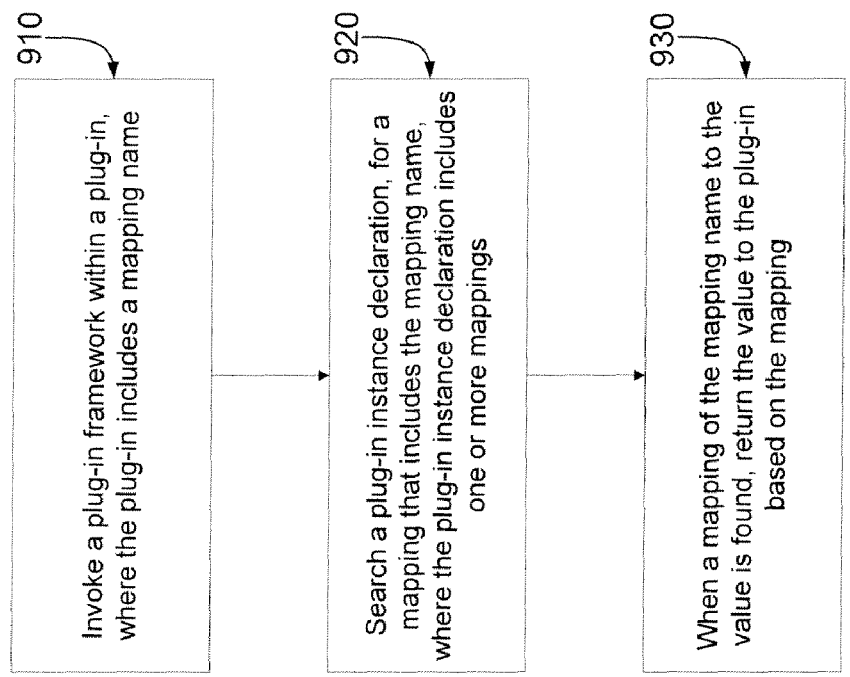
FIG. 9 illustrates a flow diagram of the functionality of a plug-in framework module that allows a plug-in to utilize a mapped value according to an embodiment of the invention.

FIG. 9 illustrates a flow diagram of the functionality of a plug-in framework module that allows a plug-in to utilize a mapped value according to an embodiment of the invention. At 910, a plug-in framework is invoked within a plug-in, where the plug-in includes a mapping name. In an embodiment, the plug-in framework is invoked by invoking a method of the plug-in framework. According to the embodiment, a plug-in framework includes a software library configured to define, register, and configure plug-ins, and a plug-in includes a software module that extends or customizes functionality of a software application that is external to the plug-in. At 920, the plug-in framework searches a plug-in instance declaration for a mapping that includes the mapping name. According to an embodiment, the plug-in instance declaration is located within a plug-in file, and the plug-in declaration includes one or more mappings. At 930, when a mapping of the mapping name to a value is found, the plug-in framework returns the value to the plug-in based on the mapping.

Thus, according to an embodiment, a plug-in can utilize metadata associated with the plug-in. The metadata can be utilized to determine whether the plug-in is the correct plug-in to implement by a software application for a specific business scenario. Therefore, a plug-in user can have a greater ability to select a plug-in that is applicable to a specific business scenario, and that will provide the appropriate extended or customized functionality. Furthermore, according to an embodiment, a plug-in can utilize mapped values. The mapped values utilized by the plug-in allows the plug-in to base the values based on a context of the plug-in. Therefore, a plug-in will be more reusable and robust, and can be used across many different contexts.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to implement a plug-in system, the implementing comprising:

invoking a plug-in framework within a plug-in, wherein the plug-in framework comprises a software library configured to define, register, and configure plug-ins, wherein the plug-in comprises a software module that extends or customizes functionality of a software application that is external to the plug-in, and wherein the plug-in comprises a mapping name;

searching a plug-in instance declaration, by the plug-in framework, for a mapping that comprises the mapping name, wherein the plug-in instance declaration is located within a plug-in file, and wherein the plug-in declaration comprises one or more mappings, and wherein the mapping maps the mapping name to an attribute; and when a mapping that comprises the mapping name is found, returning a value, by the plug-in framework, to the plug-in based on the mapping, wherein the returning the value to the plug-in based on the mapping further comprises searching a hash map for the value based on the attribute.

2. The non-transitory computer-readable medium of claim 1,
wherein the mapping maps the mapping name to the value; and
wherein the returning the value to the plug-in based on the mapping further comprises replacing the mapping name with the value.

3. The non-transitory computer-readable medium of claim 1,
wherein the hash map is provided by the plug in.

4. The non-transitory computer-readable medium of claim 1,
wherein the hash map is provided by a runtime value resolver in a plug-in point of the software application that is external to the plug-in.

5. The non-transitory computer-readable medium of claim 1,
wherein the plug-in instance declaration is located within an extensible markup language file located within the plug-in file.

6. The non-transitory computer-readable medium of claim 1,
wherein the plug-in comprises a method,
wherein when a plurality of mappings comprise the mapping name, a mapping with a mapping name that is specified for the method of the plug-in is given priority over a mapping name that is specified for all methods.

7. The non-transitory computer-readable medium of claim 1, the implementing further comprising:
associating, by the plug-in framework, metadata with the plug-in, wherein the metadata comprises one or more properties;
selecting a plug-in and identifying the metadata associated with the plug-in;
based on the metadata, determining whether the plug-in is applicable; and
loading the plug-in when the plug-in is applicable.

8. The non-transitory computer-readable medium of claim 7, wherein each property of the metadata comprises a name-value pair.

9. The non-transitory computer-readable medium of claim 7, wherein the associating the metadata with the plug-in further comprises storing the metadata in an extensible markup language file of the plug-in file.

10. A computer-implemented method for implementing a plug-in system, the computer-implemented method comprising:

invoking a plug-in framework within a plug-in, wherein the plug-in framework comprises a software library configured to define, register, and configure plug-ins, wherein the plug-in comprises a software module that extends or customizes functionality of a software application that is external to the plug-in, and wherein the plug-in comprises a mapping name;

searching a plug-in instance declaration, by the plug-in framework, for a mapping that comprises the mapping name, wherein the plug-in instance declaration is located within a plug-in file, and wherein the plug-in declaration comprises one or more mappings, and wherein the mapping maps the mapping name to an attribute; and when a mapping of the mapping name to the value is found, returning the value, by the plug-in framework, to the plug-in based on the mapping, wherein the returning the value to the plug-in based on the mapping further comprises searching a hash map for the value based on the attribute.

11. The computer-implemented method of claim 10,
wherein the mapping maps the mapping name to the value; and
wherein the returning the value to the plug-in based on the mapping further comprises replacing the mapping name with the value.

12. The computer-implemented method of claim 10,
wherein the hash map is provided by the plug-in.

13. The computer-implemented method of claim 10,
wherein the hash map is provided by a runtime value resolver in a plug-in point of the software application that is external to the plug-in.

14. The computer-implemented method of claim 10, further comprising:
associating, by the plug-in framework, metadata with the plug-in, wherein the metadata comprises one or more properties;
selecting a plug-in and identifying the metadata associated with the plug-in;
based on the metadata, determining whether the plug-in is applicable; and
loading the plug-in when the plug-in is applicable.

15. A plug-in system comprising:
a memory configured to store a plug-in framework module; and
a processor configured to execute the plug-in framework module stored on the memory;
wherein the processor is further configured, when executing the plug-in framework module stored on the memory, to:
invoke a plug-in framework within a plug-in, wherein the plug-in framework comprises a software library configured to define, register, and configure plug-ins, wherein the plug-in comprises a software module that extends or customizes functionality of a software application that is external to the plug-in, and wherein the plug-in comprises a mapping name;
search a plug-in instance declaration for a mapping that comprises the mapping name, wherein the plug-in instance declaration is located within a plug-in file, and wherein the plug-in declaration comprises one or more mappings, and wherein the mapping maps the mapping name to an attribute; and when a mapping that comprises the mapping name is found, return a value to the plug-in based on the mapping, wherein the returning the value to the plug-in based on the mapping further comprises searching a hash map for the value based on the attribute.

16. The plug-in system of claim 15, wherein the mapping maps the mapping name to the value; and wherein the processor is further configured, when executing the plug-in framework module stored on the memory, to replace the mapping name with the value.

17. The plug-in system of claim 15, wherein the hash map is provided by the plug-in.

18. The plug-in system of claim 15, wherein the hash map is provided by a runtime value resolver in a plug-in point of the software application that is external to the plug-in.

19. The plug-in system of claim 15, wherein the processor is further configured, when executing the plug-in framework module stored on the memory, to:

associate metadata with the plug-in, wherein the metadata comprises one or more properties;

select a plug-in and identify the metadata associated with the plug-in;

based on the metadata, determine whether the plug-in is applicable; and load the plug-in when the plug-in is applicable.

* * * * *

UNITED STATES PATENT AND TRADEMARK OFFICE
CERTIFICATE OF CORRECTION

PATENT NO. : 8,407,461 B2  
APPLICATION NO. : 12/971382  
DATED : March 26, 2013  
INVENTOR(S) : Cheong et al.

Page 1 of 1

It is certified that error appears in the above-identified patent and that said Letters Patent is hereby corrected as shown below:

In the Specification:

In column 14, line 55, delete ""Password ElementNum"" and insert -- "PasswordElementNum" --, therefor.

In column 17, line 4, delete ""lname,"" and insert -- "lname," --, therefor.

In column 18, line 47, delete ""value");" and insert -- "value1"); --, therefor.

In column 21, line 49, delete ""lname,"" and insert -- "lname," --, therefor.

In column 21, line 57, delete ""lname"" and insert -- "lname" --, therefor.

In column 21, line 60, delete ""lname,"" and insert -- "lname," --, therefor.

In column 21, line 63, delete ""lname."" and insert -- "lname." --, therefor.

In column 21, line 67, delete ""lname"" and insert -- "lname" --, therefor.

Signed and Sealed this  
Ninth Day of July, 2013

Teresa Stanek Rea  
*Acting Director of the United States Patent and Trademark Office*